(12) United States Patent
Kim et al.

(10) Patent No.: US 9,696,830 B2
(45) Date of Patent: *Jul. 4, 2017

(54) METHOD OF MANUFACTURING TRANSPARENT CIRCUIT SUBSTRATE FOR TOUCH SCREEN

(71) Applicant: Samsung Electronics Co., Ltd., Suwon-si (KR)

(72) Inventors: Jin-Han Kim, Daegu (KR); Yeong-Seop Lee, Gumi-si (KR); Seok-Hong Jeong, Suwon-si (KR); Myung-Sop Lee, Gumi-si (KR); Kyoung-Suk Oh, Gumi-si (KR); Jung-Hun Woo, Gumi-si (KR); Dong-Chul Lee, Gumi-si (KR); Jong-Hyun Yim, Daegu (KR); Sung-Il Jang, Chilgok-gun (KR); Yong-Gu Cho, Uiwang-si (KR); Hyoung-Jun Go, Gumi-si (KR); Kyoung-Hun Kim, Gumi-si (KR); Jeong-Eun Kim, Gumi-si (KR); Hyeon-Beom Kim, Gumi-si (KR); Dae-Bin Noh, Gumi-si (KR); Jae-Young Park, Daegu (KR); Eun-Jin Baek, Gumi-si (KR); Chung-Hee Lee, Gumi-si (KR); Sung-Ho Jung, Gumi-si (KR); Jae-Wook Cho, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 14/467,546

(22) Filed: Aug. 25, 2014

(65) Prior Publication Data

US 2014/0362311 A1 Dec. 11, 2014

Related U.S. Application Data

(63) Continuation of application No. 13/410,485, filed on Mar. 2, 2012, now Pat. No. 8,816,982.

(30) Foreign Application Priority Data

Mar. 3, 2011 (KR) .................. 10-2011-0018830

(51) Int. Cl.
*G06F 3/041* (2006.01)
*G06F 3/044* (2006.01)
*G06F 1/16* (2006.01)

(52) U.S. Cl.
CPC ............ *G06F 3/041* (2013.01); *G06F 1/1603* (2013.01); *G06F 3/044* (2013.01); *G06F 2203/04103* (2013.01); *Y10T 29/49105* (2015.01)

(58) Field of Classification Search
None
See application file for complete search history.

(56) References Cited

U.S. PATENT DOCUMENTS 6,167,138 A 12/2000 Shennib
6,674,862 B1 1/2004 Magilen
(Continued)

FOREIGN PATENT DOCUMENTS

CN 101558370 A 10/2009
EP 2 339 434 A2 6/2011
(Continued)

OTHER PUBLICATIONS

Chinese Office Action issued Aug. 8, 2014 in corresponding Chinese Application No. 20120052935.5 (23 pages with English translation).
(Continued)

*Primary Examiner* — Viet Pham
*Assistant Examiner* — Christopher Kohlman
(74) *Attorney, Agent, or Firm* — NSIP Law

(57) ABSTRACT

Provided is a method of manufacturing a transparent circuit substrate for a touch screen. The method may involve
(Continued)

forming an electrode layer on a transparent substrate, stacking a light shielding layer on the transparent substrate such that the light shielding layer is located on an outside of the electrode layer, stacking a mask on the light shielding layer and the electrode layer, forming a conductive layer on the mask, forming connecting lines for connecting the electrode layer and connecting terminals by removing the mask and a portion of the conductive layer, and forming the connecting terminals on the light shielding layer such that the connecting terminals contact the connecting lines.

19 Claims, 6 Drawing Sheets

(56) References Cited

U.S. PATENT DOCUMENTS

| | | | |
|---|---|---|---|
| 7,777,733 | B2 | 8/2010 | Yamamoto et al. |
| 2001/0048064 | A1* | 12/2001 | Kitani ............... H01L 27/14618 250/208.1 |
| 2007/0182720 | A1 | 8/2007 | Fujii et al. |
| 2007/0249107 | A1 | 10/2007 | Yamamoto et al. |
| 2008/0021517 | A1 | 1/2008 | Dietrich |
| 2008/0070635 | A1 | 3/2008 | Bang et al. |
| 2008/0204611 | A1 | 8/2008 | Matsumoto et al. |
| 2009/0160817 | A1 | 6/2009 | Wu et al. |
| 2009/0201268 | A1* | 8/2009 | Endo ....................... G06F 3/045 345/174 |
| 2010/0013785 | A1 | 1/2010 | Murai et al. |
| 2010/0164881 | A1* | 7/2010 | Kuo ........................ G06F 3/044 345/173 |
| 2011/0134075 | A1 | 6/2011 | Takusa |
| 2011/0141034 | A1* | 6/2011 | Lai .......................... G06F 3/041 345/173 |
| 2011/0187666 | A1 | 8/2011 | Min |
| 2011/0234526 | A1 | 9/2011 | Mi |
| 2011/0242057 | A1 | 10/2011 | Lee et al. |
| 2014/0217059 | A1 | 8/2014 | Park |

FOREIGN PATENT DOCUMENTS

| | | |
|---|---|---|
| JP | 5-93915 A | 4/1993 |
| JP | 2002-367774 A | 12/2002 |
| KR | 10-2008-0093611 A | 10/2008 |
| KR | 10-2009-0108373 A | 10/2009 |
| KR | 10-2010-0042370 A | 4/2010 |
| KR | 10-2011-0008453 A | 1/2011 |
| TW | 201102698 A1 | 1/2011 |
| WO | WO 2009/157645 A1 | 12/2009 |
| WO | WO 2010/024542 A2 | 3/2010 |

OTHER PUBLICATIONS

Extended European Search Report issued Mar. 3, 2016 in counterpart European Application No. EP 12158049.2 (10 pages).

* cited by examiner

METHOD OF MANUFACTURING TRANSPARENT CIRCUIT SUBSTRATE FOR TOUCH SCREEN

CROSS-REFERENCE TO RELATED APPLICATION

This application is a Continuation Application of U.S. application Ser. No. 13/410,485, filed Mar. 2, 2012, which claims the benefit under 35 U.S.C. §119(a) of Korean Patent Application No. 10-2011-0018830 filed on Mar. 3, 2011, in the Korean Industrial Property Office, the entire disclosure of which is incorporated herein by reference for all purposes.

BACKGROUND

1. Field

The following description relates generally to a touch screen, and more particularly to a method of manufacturing a transparent circuit substrate for a touch screen. The transparent circuit substrate may include an electrode layer, and it may form a front surface of a touch screen.

2. Description of the Related Art

In general, a touch screen refers to a device where an input detection unit is integrated with a display unit. A touch screen may include, for example, a display unit such as a liquid crystal display (LCD) along with a touch panel disposed on such a display unit.

When a finger tip of a user or another object contacts a letter or a specific location displayed on such a touch screen, the touch screen may be configured to recognize the location and receive an input of the user through a screen contact without the use of a mechanical keypad.

Such touch screens usually do not show high precision. However, they are widely used as a guide display device in places generally used by the public, for example, as in public places such as subways, department stores, and banks. This is because it is simple to manipulate such touch screens to input information. Further, touch screens are widely used in sales terminals of various stores. In recent years, touch screens are also widely used in portable terminals such as mobile phones, DMB (Digital Multimedia Broadcasting) receivers, and vehicle navigation systems.

Some examples of touch screens (or touch panels) include a resistive overlay type touch screen, a capacitive overlay type touch screen, a surface acoustic wave type touch screen, and an infrared beam type touch screen.

In a typical capacitive overlay type touch screen, the first and second electrode layers are usually formed on the first and second films, respectively. The first film is usually bonded to an upper glass substrate that forms a front surface of the touch screen. The second film is usually bonded to a lower substrate. The first and second electrode layers are usually connected to a control unit via connecting terminals. The control unit may detect a change in the electrostatic capacitance at a corresponding part of the touch panel in response to a contact by an input device such as a stylus pen, a finger, and the like.

However, since the conventional capacitive overlay type touch screen includes a plurality of films, it usually has a large thickness with a low light transmission.

As a material having a high transmission is usually used as the films for the touch screen, an entire light transmission from the touch screen cannot be transmitted to the user. Rather, because the light transmission of each film is less than 100%, the light transmission of the touch screen is reduced as the number of the films inside the touch screen increases.

Since a conventional capacitive overlay type touch screen typically includes a plurality of films, the touch screen usually has a large thickness and a low light transmission. The low light transmission degrades the visibility of the screen, and it is also difficult to reduce the overall thickness of a product containing such a touch screen.

SUMMARY

In one general aspect, there is provided a method of manufacturing a transparent circuit substrate for a touch screen. The method may involve forming an electrode layer on a transparent substrate, stacking a light shielding layer on the transparent substrate such that the light shielding layer is located on an outside of the electrode layer, stacking a mask on the light shielding layer and the electrode layer, forming a conductive layer on the mask, forming connecting lines for connecting the electrode layer and connecting terminals by removing the mask and a portion of the conductive layer, and forming the connecting terminals on the light shielding layer such that the connecting terminals contact the connecting lines.

The electrode layer may be formed on the transparent substrate by forming a layer of a conductive material on an entire upper surface of the transparent substrate, and forming the electrode layer having a preset pattern by partially etching the conductive material.

In addition, the mask may be stacked in a region other than regions where the electrode layer and the connecting terminals are connected to each other. The mask may be formed with a peelable ink that may be removed by peeling or with a bonding tape that is removed by detaching.

Each of the connecting lines may be formed as to extend from the electrode layer formed on an upper surface of the transparent substrate to at least one of the connecting terminals formed on an upper surface of the light shielding layer.

The electrode layer may be formed on the transparent substrate via a deposition process. Suitable materials for forming the electrode layer includes indium tin oxide, PEDOT and the like.

In another aspect, a method of producing a touch screen is provided. The method may involve bonding a transparent circuit substrate with a display unit. The transparent circuit substrate may have a transparent substrate, an upper electrode layer, a first bonding member, a lower electrode layer, and a film, stacked in that order.

The upper surface of the transparent substrate may be exposed to an outside. Upper connecting lines for connecting the upper electrode layer and upper connecting terminals may be formed on the transparent substrate, and lower connecting lines for connecting the lower electrode layer and lower connecting terminals may be formed on the film.

The upper electrode layer may be formed on the transparent substrate by forming a layer of a conductive material on an entire upper surface of the transparent substrate, and forming the upper electrode layer having a preset pattern by partially etching the conductive material.

An upper light shielding layer may be formed on the transparent substrate such that the upper light shielding layer is located on a periphery of the transparent substrate with respect to the upper electrode layer. Each of the upper connecting lines may extend from the upper electrode layer formed on a lower surface of the transparent substrate to at least one of the upper connecting terminals formed on a lower surface of the upper light shielding layer.

The upper electrode layer may be formed on the transparent substrate via a deposition process. The upper electrode layer and the lower electrode layer may comprise indium tin oxide or PEDOT.

In yet another aspect, a display device is provided. The display device may include a transparent substrate, an upper electrode layer, a first bonding member, a lower electrode layer, and a film, stacked in that order.

At least a portion of the upper surface of the transparent substrate may be configured to be exposed to an outside. Upper connecting lines for connecting the upper electrode layer and upper connecting terminals may be formed on the transparent substrate. Lower connecting lines for connecting the upper electrode layer and lower connecting terminals may be formed on the film.

The display device may further include a display unit. The display unit may be bonded to the film via a second bonding member.

An upper light shielding layer may be formed on the transparent substrate such that the upper light shielding layer is located on a periphery of the transparent substrate with respect to the upper electrode layer. Each of the upper connecting lines may extend from the upper electrode layer formed on a lower surface of the transparent substrate to at least one of the upper connecting terminals formed on an upper surface of the upper light shielding layer.

The upper electrode layer may be formed on the transparent substrate via a deposition process. The upper electrode layer and the lower electrode layer may be formed with indium tin oxide or PEDOT.

Other features and aspects may be apparent from the following detailed description, the drawings and the claims.

Figure 1:
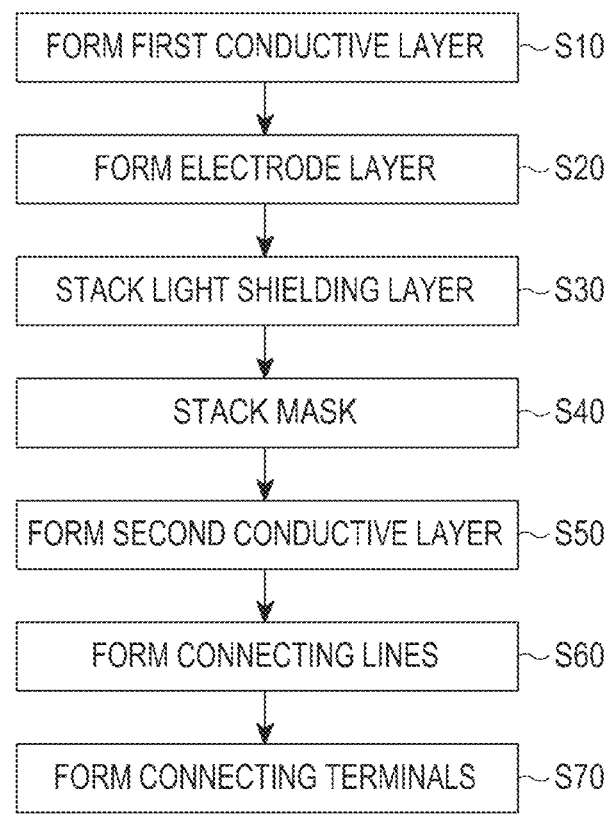
FIG. 1 is a flowchart illustrating an example of a method of manufacturing a transparent circuit substrate for a touch screen.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Hereinafter, examples of methods of manufacturing a transparent circuit substrate for a touch panel are described. In addition, touch screens to which such a transparent circuit substrate for a touch panel is applied are described.

It is noted that in a typical capacitive overlay type touch screen, an electrode layer is typically formed on a film, and the film is bonded to a glass substrate. In a transparent circuit substrate for a touch screen, however, an electrode layer may be directly formed on a glass substrate.

FIG. 1 illustrates an example of a method of manufacturing a transparent circuit substrate for a touch screen, and FIGS. 2 to 8 illustrate the detailed steps of an example of a method of manufacturing a transparent circuit substrate.

The method of manufacturing a transparent circuit substrate for a touch screen may include a step S10 of forming a first conductive layer, a step S20 of forming an electrode layer, a step S30 of stacking a light shielding layer, a step S40 of stacking a mask, a step S50 of forming a second conductive layer, a step S60 of forming connecting lines, and a step S70 of forming connecting terminals.

Figure 2:
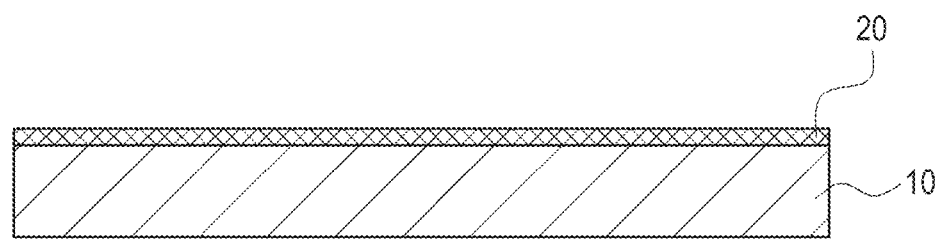
FIGS. 2 to 8 are views illustrating detailed steps of an example of a method of manufacturing a transparent circuit substrate.

Referring to FIG. 2, in the step S10 of forming a first conductive layer, a first conductive layer 20 may be stacked on an entire upper surface of a transparent substrate 10. The lower surface of the transparent substrate 10 may form at least a portion of a front surface of the touch screen exposed to the outside. The transparent substrate 10 may be formed of an insulating material that is transparent to visible light. Examples of such insulating materials include glass, polyethylene terephthalate (PET), polycarbonate (PC), and the like. The first conductive layer 20 may be formed of a conductive material which is transparent to visible light; examples of such conductive materials include indium tin oxide (ITO), PEDOT (poly(3,4-ethylenedioxythiophene)), and the like. The first conductive layer 20 may be formed by a deposition process such as electronic beam deposition and sputtering. Examples of such a sputtering process include PVD (Physical Vapor Deposition), CVD (Chemical Vapor Deposition), PECVD (Plasma-Enhanced Chemical Vapor Deposition), and the like.

Figure 3:
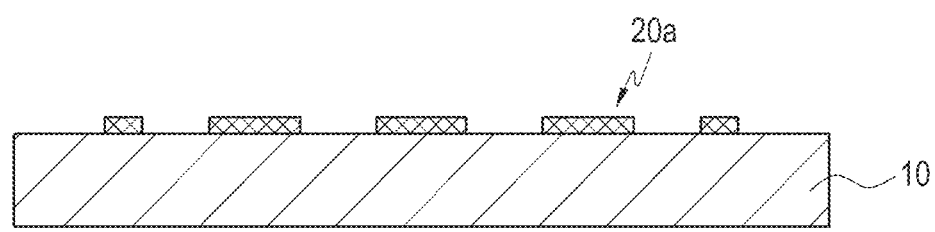

Referring to FIG. 3, in the step S20 of forming an electrode layer, an electrode layer 20a having a preset pattern may be formed by partially (or selectively) etching the first conductive layer 20 that is formed on the transparent substrate 10.

The electrode layer 20a may be formed through a photolithography process. In the photolithography process, a photoresist layer having a uniform thickness may be stacked on the entire upper surface of the first conductive layer through a spin process. The photoresist may be hardened by partially (or selectively) irradiating the photoresist layer with ultraviolet rays. A photoresist mask having a plurality of slits may be formed by removing an unhardened portion of the photoresist layer using an etching solution. The electrode layer 20a may be formed by etching the first conductive layer 20 exposed through the slits of the photoresist mask.

Figure 4:
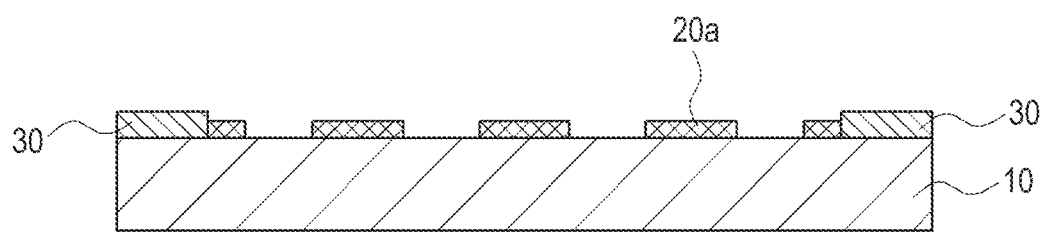

Referring to FIG. 4, in the step S30 of stacking a light shielding layer, a light shielding layer 30 may be stacked on an upper surface of the transparent substrate 10 such that the light shielding layer 30 is located on the outside of the electrode layer 20a. Since a lower surface of the transparent substrate 10 may be exposed to the outside, the light shielding layer 30 for shielding visible light may be stacked at a periphery of the upper surface of the transparent substrate 10 to prevent an outer periphery of a central part included in an effective display region from being displayed to an observer. The light shielding layer 30 may be formed through a process such as black ink printing.

Figure 5:
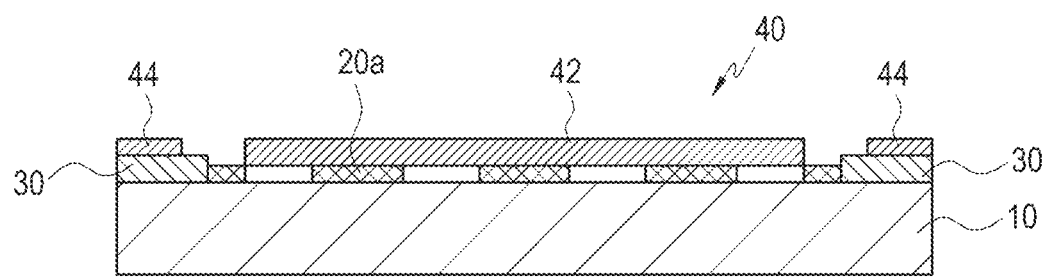

Referring to FIG. 5, in the step S40 of stacking a mask, a mask 40 may be stacked on the light shielding layer 30 and the electrode layer 20a. In order to form connecting lines, the mask 40 may be stacked such that a mask central part 42 located in an effective display region and a side end of the light shielding layer 30 are spaced apart from each other. That is, the mask 40 may be stacked at a portion other than a region where the electrode layer 20a and the connecting terminal (see FIG. 8) are connected to each other.

Meanwhile, although it is illustrated that a part of the electrode layer 20a is located within a space where the connecting lines are to be formed in this example, a portion of the electrode layer 20a may not exist within the space where the connecting lines are to be formed under the condition where the connecting lines are connected to the electrode layer 20a. A transparent circuit substrate having such connecting lines are a part of the present disclosure.

The mask 40 may be formed by printing a plating preventing peelable ink that can be easily removed by peeling without a separate separation process, or through a process of attaching a bonding tape that may removed by detaching the bonding tape.

When the peelable ink is used, after being printed in a liquid state, the peelable ink is dried and hardened. The hardened peelable ink may be peeled and removed after the step S50 of forming a second conductive layer and the step S60 of forming connecting lines.

When the bonding tape is used, the bonding tape may be detached and removed after the step S50 of forming a second conductive layer and the step S60 of forming connecting lines.

A mask peripheral part 44 may be stacked on a portion of the upper surface of the light shielding layer 30 such that the connecting lines extend to the upper surface of the light shielding layer 30. That is, an inner portion of the upper surface of the light shielding layer 30 may be exposed to the outside.

Figure 6:
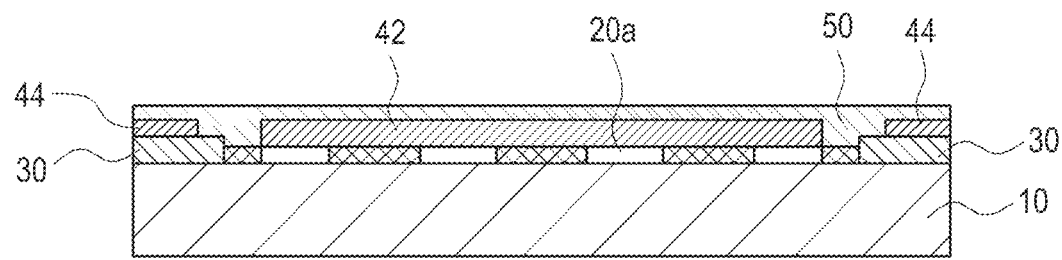

Referring to FIG. 6, in the step S50 of forming a second conductive layer, a second conductive layer 50 may be stacked on the upper surface of the mask 40 and in a space between the mask central part 42 and the mask peripheral part 44. That is, the second conductive layer 50 may be stacked so as to completely surround an entire outer surface of the mask central part 42 and an outer surface other than one side surface of the mask peripheral part 44.

Figure 7:
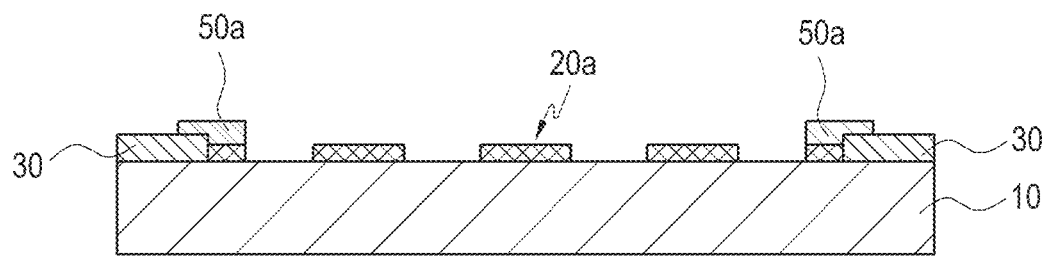

Referring to FIG. 7, in the step S60 of forming connecting lines, connecting lines 50a for connecting the electrode layer 20a and the connecting terminals may be formed by removing the mask 40 and a portion of the second conductive layer 50. The connecting lines 50a connected to the electrode layer 20a may extend from the upper surface of the transparent substrate 10 to the upper surface of the light shielding layer 30.

Figure 8:
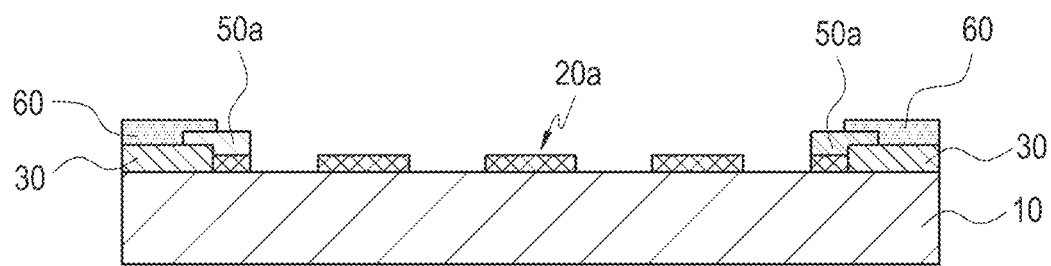

Referring to FIG. 8, in the step S70 of forming connecting terminals, connecting terminals 60 may be stacked on the exposed upper surface of the light shielding layer 30 and some portions of the upper surfaces of the connecting lines 50a so as to contact the connecting lines 50a. The connecting terminals 60 may be configured to apply electrical currents to the electrode layer 20a. In addition, providing the connecting terminals 60 on the outside of the electrode layer 20a along the periphery of the transparent substrate 10 may make it easy to access the connecting terminals 60 from an outside of the transparent circuit substrate. The connecting terminals 60 may be formed of a same material as the electrode layer 20a or may be formed of another material. For example, the connecting terminals 60 may be formed of an opaque conductive material such as silver, a transparent conductive ink, and the like.

In the above-mentioned example of a method of manufacturing a transparent circuit substrate for a touch screen, since the light shielding layer 30 is formed after the electrode layer 20a is formed, it is possible to prevent the degradation of quality of the electrode layer 20a due to an outgas from the light shielding layer 30. In addition, an increase in a surface resistance of the electrode layer 20a, a degradation of a light transmission, and a degradation of visibility due to a change in chrominance that may be caused by the formation of the light shielding layer 30 can also be prevented.

Further, since the connecting lines 50a are formed with the mask 40 being stacked on the light shielding layer 30 according to the method, the light shielding layer 30 may be prevented from being damaged or discolored due to the heat that may be generated during a deposition process.

Hereinafter, an example of a touch screen to which the transparent circuit substrate may be applied is described in detail. It is noted that the transparent circuit substrate, and the method of manufacturing the same, may be applied to various touch screens. The touch screen described below is simply an example of the various touch screens that may be used with such a transparent circuit substrate.

Figure 9:
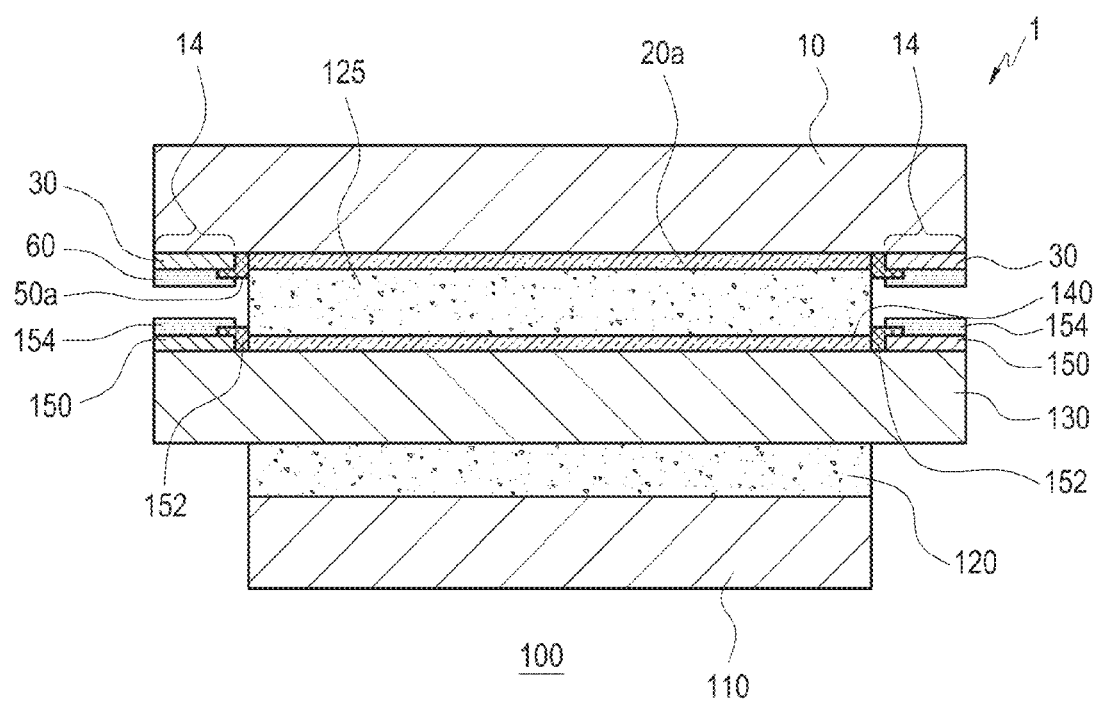
FIG. 9 is a view illustrating an example of a touch screen.
Figure 10:
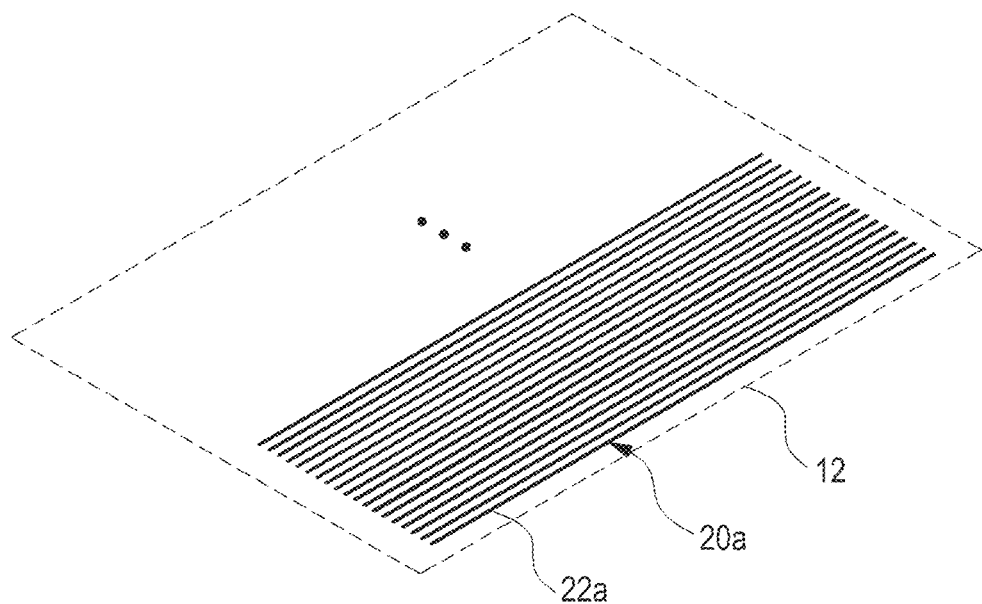
FIG. 10 is a view illustrating examples of upper and lower electrode layers in a touch screen.
Figure 10:
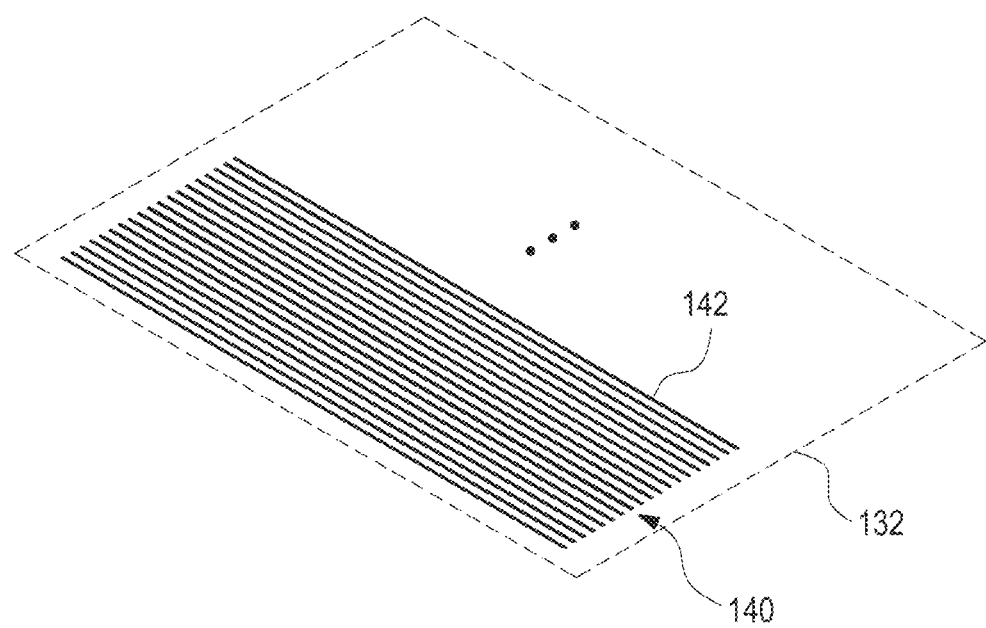

FIG. 9 illustrates an example of a touch screen formed with a transparent circuit substrate. FIG. 10 illustrates examples of upper and lower electrode layers of a transparent circuit substrate. It is noted that since the transparent circuit substrate 1 may be applied in an overturned state to the touch screen 100 as illustrated in FIG. 9, the upper and lower sides (including upper and lower portions) are classified according to the shown configuration. Further, a repeated description of the transparent circuit substrate 1 will be omitted.

The touch screen 100 may include a display unit 110, a film 130, a transparent circuit substrate 1 having a transparent substrate 10 and an upper electrode layer 20a, a lower electrode layer 140, and first and second bonding members 120 and 125.

The display unit 110 may include a plurality of pixels, and may display an image through the pixels. Although only a portion, such as the central part, of an upper surface of the display unit 110 may be included in an effective display region of the touch screen 100 displayed to an observer, the entire upper surface of the display unit 110 may be included in an effective display region, as in the illustrated example. Examples of the display unit 110 include a liquid crystal display (LCD), an organic light emitting diode (OLED), and the like.

The liquid crystal display may display an image under the control of a control unit (not shown). Such a liquid crystal display may include a liquid crystal panel including a liquid crystal layer in order to display an image, as well as a backlight unit (BLU) for providing light to the liquid crystal panel. The liquid crystal panel may include upper and lower glass substrates that are disposed on and under the layer of liquid crystal. Such a lower glass substrate may include thin film transistors and pixel electrodes, and the upper glass substrate may include a common electrode. The liquid crystal panel may further include upper and lower polarization plates disposed on and under the liquid crystal panel to linearly polarize the input light respectively. Te polarization directions of the upper and lower polarization plates may be perpendicular to each other.

The film 130 may be disposed on the display unit 110 and may include a lower electrode layer 140 that is stacked on an upper end (i.e. an upper surface) thereof. The areas occupied by the upper and lower electrode layers 20a and 140 respectively may coincide with the area of the effective display region. The film 130 may be formed of an insulating material that is transparent to visible light. Examples of suitable insulating materials include polyethylene terephthalate (PET), polycarbonate (PC), polyethylene naphthalate (PEN), polyphenylene sulfide (PPS), polyethersulfone (PES), and the like.

The film 130 may be attached to the display unit 110 by, for example, a bonding process using a first bonding member 120. That is, a portion of a lower end (i.e. a lower surface) of the film 130 may be attached to the entire upper end (i.e. the entire upper surface) of the display unit 110 by using the first bonding member 120. One or both of the first and second bonding members 120 and 125 may be formed of an insulating material that is transparent to visible light. The bonding members 120 and 125 may include an optical clear adhesive tape (OCA tape), an adhesive (or adhering material), and an ultraviolet ray hardening resin which are transparent to visible light. The OCA tape may be double-sided, and may be formed of a material such as acryl, silicon, and the like.

Referring to FIG. 10, the lower electrode layer 140 may include a plurality of lower electrode lines (or line electrodes) stacked on the upper surface 132 of the film 130. In addition, the lower electrode layer 140 may extend along a first direction, for example, the x-axis or horizontal direction. The lower electrode lines 142 may be disposed at regular or irregular directions along a second direction. For example, the lower electrode lines 142 may extend along the y-axis or vertical direction, crossing the first direction and perpendicular to the first direction. The line widths of the lower electrode lines 142 and the intervals between the lower electrode lines 142 may be arbitrarily set, and the interval between the lower electrode lines 142 may be set to 4 mm, for example. The upper electrode layer 20a may be formed in the same fashion as the lower electrode layer 140.

Referring back to FIG. 1, together with the upper connecting terminals 60, the lower connecting terminals 154 for applying currents to the upper and lower electrode layers 20a and 140 may be stacked on an upper surface of the film 130 so as to be located on the outside of the lower electrode layer 140. That is, the lower connecting terminals 154 may be disposed on the outside of the lower electrode layer 140, i.e. at the periphery of the film 130, to make it easy to access the lower connecting terminals 154 from an outside of the transparent circuit substrate. Then, the central part of the film 130 may be included in the effective display region of the touch screen 100, and the periphery of the film 130 may be set to correspond to a region located on the outside of the effective display region, i.e. a region excluding the central part.

The lower connecting terminals 154 may be electrically connected to the lower electrode layer 140 through the lower connecting lines 152. The lower light shielding layer 150, the lower connecting lines 152, and the lower connecting terminals 154 may be formed in the same fashion as the upper light shielding layer 30, the upper connecting lines 50a, and the upper connecting terminals 60, respectively.

Meanwhile, although it has been described above that the film 130 includes the lower light shielding layer 150 to show that the method of manufacturing a transparent circuit substrate 1 for a touch screen can be applied to the film 130 in the above example, the lower light shielding layer 150 may be removed in other examples. Such examples are a part of the present application.

In such a case, the lower electrode layer 140, the lower connecting lines 152, and the lower connecting terminals 154 may be sequentially formed in a fashion similar to the above-mentioned method. The lower connecting terminals 154 and the connecting lines 152 may be formed together with the lower electrode layer 140 in a single process, or may be formed through separate processes. The lower connecting terminals 154 may be formed of the same material as that of the lower electrode layer 140, or may be formed of another material such as an opaque conductive material like silver. The upper and lower connecting terminals 60 and 154 may be electrically connected, for example, to a connector of a flexible printed circuit board (FPCB) to which a control unit or the like are mounted.

The transparent substrate 10 may include an upper electrode layer 20a disposed on the film 130 and stacked on a lower surface thereof. The upper surface of the transparent substrate 10 may form at least a portion of the front surface of the touch screen 100 exposed to the outside.

Since the upper surface of the transparent substrate 10 may be exposed to the outside, an upper light shielding layer 30 for shielding visible light may be stacked at a periphery 14 of the lower surface of the transparent substrate 10 to prevent a peripheral portion of the outside of a central part included in the effective display region from being viewed from the outside.

The transparent substrate 10 may be attached (i.e. bonded) to the film 130 by using a second bonding member 125. That is, a lower end of the transparent substrate 10 may be attached to an upper end of the film 130 by using the second bonding member 125. Then, only the upper and lower electrode layer 20a and 140 may be attached to each other by using the second bonding member 125.

Referring to FIG. 10, the upper electrode layer 20a may include a plurality of upper electrode lines (or line electrodes) 22a stacked on the lower surface 12 of the transparent substrate 10 and disposed at a regular interval or irregular intervals along the second direction. Each upper electrode line 22a may extend along the first direction crossing the second direction perpendicular to the second direction. The line widths of the upper electrode lines 22a and the intervals between the upper electrode lines 22a may be arbitrarily set, and the interval between the upper electrode lines 22a may be set to 4 mm.

Figure 11:
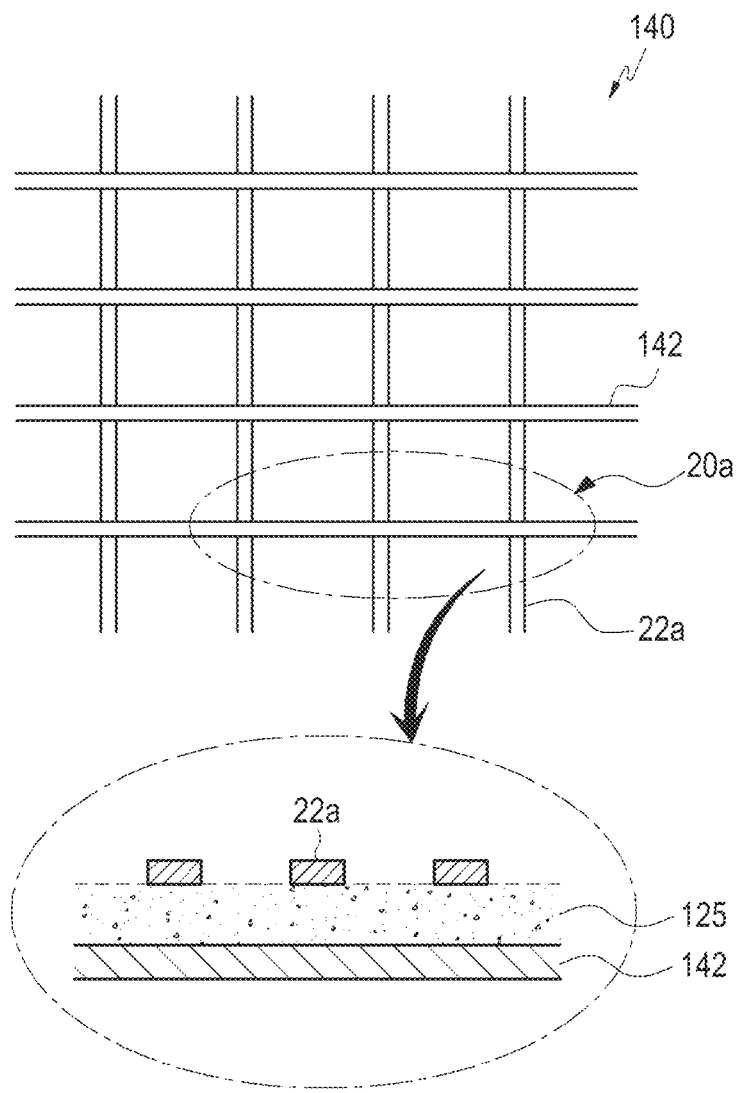
FIG. 11 is a view for explaining an example of a principle of forming an electrostatic capacitance with first and second electrode layers in a touch screen.

FIG. 11 is a view for explaining a principle that may be used to form an electrostatic capacitance with upper and lower electrode layers 22a and 140. FIG. 11 illustrates a plan view and a partially sectional view of the upper and lower electrode layers 22a and 140 attached to each other by the second bonding member 125.

The second binding member 125 interposed between the upper and lower electrode layers 22a and 140 may serve as an insulating body, and an electrostatic capacitance may be generated by applying currents to the upper and lower electrode layers 22a and 140. A touch sensitivity of the touch screen 100 may be regulated by regulating a thickness of the second bonding member 125.

The above described methods of manufacturing a transparent circuit substrate for a touch screen can prevent a degradation of a quality of the electrode layer due to an outgas of the light shielding layer. Accordingly, it is possible to prevent an increase in a surface resistance of the electrode layer, a degradation of a light transmission, and a degradation of visibility due to a change in chrominance.

Further, according to the described methods, since the connecting lines may be formed with the mask being stacked on the light shielding layer, the light shielding layer can be prevented from being damaged or discolored due to the heat generated in a deposition process.

An aspect of the above described examples of manufacturing methods for producing transparent circuit substrates is that it is possible to provide a transparent circuit substrate for a touch screen that is capable of enhancing the visibility of the screen and making the product slim due to the small thickness and high light transmission of the transparent circuit substrates.

Another aspect of the above mentioned examples is to provide a method of manufacturing a transparent circuit substrate for a touch screen which can prevent the degradation of the quality of the electrode layer due to an outgas of the light shielding layer. Thus, it is possible to prevent the increase of the surface resistance of the electrode layer, the degradation of the light transmission by the touch screen, and the degradation of visibility due to a change in chrominance.

In addition, in the touch screen to which the above described transparent circuit substrate is applied, since the upper electrode layer stacked on the transparent substrate and the lower electrode layer stacked on the film are attached to each other, the touch screen can realize a small thickness thereof, a high light transmission, a high visibility of a screen, and a slimness of the overall product.

It is understood that the features of the present disclosure may be embodied in different forms and should not be constructed as limited to the examples set forth herein. Rather, the examples are provided so that this disclosure will be thorough and complete, and will convey the full scope of the present disclosure to those skilled in the art. The drawings may not be necessarily drawn to scale, and, in some instances, proportions may have been exaggerated in order to clearly illustrate features of the examples.

In addition, when a first layer is referred to as being "on" a second layer or "on" a substrate, it may not only refer to a case where the first layer is formed directly on the second layer or the substrate but may also refer to a case where a third layer exists between the first layer and the second layer or the substrate.

A number of examples have been described above. Nevertheless, it will be understood that various modifications may be made. For example, suitable results may be achieved if the described techniques are performed in a different order and/or if components or steps in a described architecture, device or method are combined in a different manner and/or replaced or supplemented by other components, steps or their equivalents. Accordingly, other implementations are within the scope of the following claims.

What is claimed is:

1. An apparatus comprising:
a transparent substrate to cover a display unit, the display unit operatively coupled with the apparatus;
an electrode layer directly disposed on the transparent substrate;
a light shielding layer disposed over the transparent substrate;
a conductive line disposed over at least a portion of the electrode layer and at least a first port ion of the light shielding layer, and
a connecting terminal disposed on at least a second portion of the light shielding layer, the connecting terminal being electrically coupled with the electrode layer via the conductive line.

2. The apparatus of claim 1, wherein the connecting terminal is disposed over at least a portion of the conductive line.

3. The apparatus of claim 1, further comprising:
another electrode layer disposed over the transparent substrate, the other electrode layer separated from the electrode layer via an insulating layer disposed over the transparent substrate.

4. The apparatus of claim 3, wherein at least one of the electrode layer or the other electrode layer is configured to form a part of a signal path to detect a touch.

5. The apparatus of claim 3, further comprising:
another conductive line disposed over at least a portion of the other electrode layer.

6. The apparatus of claim 3, wherein the other electrode layer is directly disposed on the transparent substrate.

7. The apparatus of claim 3, wherein the other electrode layer is bonded to the display via another insulating layer disposed over the display.

8. The apparatus of claim 3, further comprising:
a film disposed between the other electrode layer and the display.

9. The apparatus of claim 8, further comprising:
another light shielding layer disposed over the film.

10. The apparatus of claim 1, wherein the light shielding layer is directly disposed on at least a portion of the electrode layer.

11. The apparatus of claim 1, wherein the transparent substrate, the electrode layer, the light shielding layer, and the conductive line are disposed in order.

12. The apparatus of claim 1, wherein the light shielding layer is located on at least a portion of a periphery of the transparent substrate.

13. The apparatus of claim 1, wherein the electrode layer is at least partially composed of a conductive material and the conductive line is at least partially composed of the conductive material.

14. The apparatus of claim 1, wherein the conductive line is directly disposed on both the at least a portion of the electrode layer and the at least first portion of the light shielding layer.

15. An apparatus comprising:
a control unit;
a display unit; and
a touch panel operatively coupled with the display unit, the touch panel including:
an electrode layer and a light shielding layer disposed over the display unit;
a conductive line disposed over at least a portion of the electrode layer and at least a first portion of the light shielding layer, the conductive line forming a part of a signal path between the electrode layer and the control unit, and
a connecting terminal disposed on at least a second portion of the light shielding layer, the connecting terminal being electrically coupled with the electrode layer via the conductive line.

16. The apparatus of claim 15, wherein the electrode layer is directly disposed on a transparent substrate.

17. A method of manufacturing an apparatus, the method comprising:
forming an electrode layer on a transparent substrate, the transparent substrate to cover at least one portion of a display unit;
disposing a light shielding layer on the transparent substrate;

disposing a mask over the transparent substrate, the mask including a pattern to expose at least one portion of the electrode layer and at least a first portion of the light shielding layer;

forming a conductive layer on the mask;

removing the mask such that a first portion of the conductive layer corresponding to the at least one portion of the electrode layer and a second portion of the conductive layer corresponding to the at least first portion of the light shielding layer form at least a portion of a conductive line; and forming a connecting terminal on at least a second portion of the light shielding layer and on at least one portion of the conductive line, the connecting terminal being electrically coupled with the electrode layer via the conductive line to enable transmission of a signal to the electrode layer.

18. The method of claim 17, further comprising:

forming an insulating layer over the transparent substrate; and forming another electrode layer over the transparent substrate such that the other electrode layer is separated from the electrode layer via the insulating layer.

19. The method of claim 18, further comprising:

bonding the other electrode layer to the display unit via another insulating layer disposed over the display unit.

* * * * *